(12) United States Patent
Morein et al.

(10) Patent No.: US 9,857,925 B2
(45) Date of Patent: Jan. 2, 2018

(54) COMBINING SENSOR ELECTRODES IN A MATRIX SENSOR

(71) Applicant: Synaptics Incorporated, San Jose, CA (US)

(72) Inventors: Stephen L. Morein, San Jose, CA (US); Jeffrey A. Small, Rochester, NY (US); Christopher A. Ludden, Pittsford, NY (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 462 days.

(21) Appl. No.: 14/502,905

(22) Filed: Sep. 30, 2014

(65) Prior Publication Data
US 2016/0092000 A1    Mar. 31, 2016

(51) Int. Cl.
*G06F 3/044* (2006.01)
*G06F 3/041* (2006.01)

(52) U.S. Cl.
CPC .......... *G06F 3/044* (2013.01); *G06F 3/0412* (2013.01); *G06F 3/0416* (2013.01)

(58) Field of Classification Search
CPC .... G06F 3/03547; G06F 3/041; G06F 3/0412; G06F 3/0416; G06F 3/0418; G06F 3/044; G01D 5/24; G01R 27/26; G01R 27/2605; H03K 17/945; H03K 17/955; H03K 17/962; H03K 17/9622; H03K 17/965; H03K 17/975
See application file for complete search history.

(56) References Cited

U.S. PATENT DOCUMENTS

| | | | |
|---|---|---|---|
| 4,550,310 | A | 10/1985 | Yamaguchi et al. |
| 5,841,078 | A | 11/1998 | Miller et al. |
| 5,945,980 | A | 8/1999 | Moissev et al. |
| 6,054,979 | A | 4/2000 | Sellers |
| 7,417,441 | B2 | 8/2008 | Reynolds |
| 7,521,942 | B2 | 4/2009 | Reynolds |
| 7,583,092 | B2 | 9/2009 | Reynolds et al. |
| 7,649,524 | B2 | 1/2010 | Haim et al. |
| 7,663,607 | B2 | 2/2010 | Hotelling et al. |
| 7,859,521 | B2 | 12/2010 | Hotelling et al. |
| 7,911,456 | B2 | 3/2011 | Gillespie et al. |
| 7,920,129 | B2 | 4/2011 | Hotelling et al. |
| 8,054,300 | B2 | 11/2011 | Bernstein |
| 8,243,027 | B2 | 8/2012 | Hotelling et al. |

(Continued)

FOREIGN PATENT DOCUMENTS

| | | |
|---|---|---|
| CN | 1971352 A | 5/2007 |
| JP | 10505182 A | 5/1998 |
| JP | 2007533044 A | 11/2007 |

*Primary Examiner* — Huy Q Phan
*Assistant Examiner* — David Frederiksen
(74) *Attorney, Agent, or Firm* — Patterson + Sheridan, LLP

(57) ABSTRACT

A display device having a capacitive sensing device, a processing system, and a method are provided for detecting presence of an input object using a capacitive sensing device having a plurality of sensor electrodes arranged in a matrix. The described technique programmatically combines multiple sensor electrodes into a larger sensor electrode for absolute capacitive sensing. The sets of sensor electrodes that are combined may be selectively coupled based a window size and a step size associated with a number of sensor electrodes in common between the sets.

19 Claims, 6 Drawing Sheets

(56) References Cited

U.S. PATENT DOCUMENTS

| | | |
|---|---|---|
| 8,258,986 B2 | 9/2012 | Makovetskyy |
| 8,259,076 B2 | 9/2012 | Trent, Jr. et al. |
| 8,305,359 B2 | 11/2012 | Bolender et al. |
| 8,462,135 B1 | 6/2013 | Xiao et al. |
| 8,487,907 B2 | 7/2013 | Huang et al. |
| 8,519,975 B2 | 8/2013 | Huang et al. |
| 8,525,801 B2 | 9/2013 | Huang et al. |
| 8,564,553 B2 | 10/2013 | Yeh et al. |
| 8,592,698 B2 | 11/2013 | Hung et al. |
| 8,605,056 B2 | 12/2013 | Mai et al. |
| 8,847,900 B2 * | 9/2014 | Philipp .............. G06F 3/045 345/173 |
| 2002/0185981 A1 | 12/2002 | Dietz et al. |
| 2005/0156881 A1 | 7/2005 | Trent et al. |
| 2006/0244733 A1 | 11/2006 | Geaghan |
| 2007/0074914 A1 | 4/2007 | Geaghan et al. |
| 2007/0247443 A1 | 10/2007 | Philipp |
| 2008/0042661 A1 | 2/2008 | Reynolds |
| 2008/0048997 A1 | 2/2008 | Gillespie et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0157782 A1 | 7/2008 | Krah |
| 2008/0158172 A1 | 7/2008 | Hotelling et al. |
| 2008/0158183 A1 | 7/2008 | Hotelling et al. |
| 2008/0162996 A1 | 7/2008 | Krah et al. |
| 2008/0162997 A1 | 7/2008 | Vu et al. |
| 2008/0246723 A1 | 10/2008 | Baumbach |
| 2009/0009195 A1 | 1/2009 | Seguine |
| 2009/0273579 A1 | 11/2009 | Zachut et al. |
| 2009/0284495 A1 | 11/2009 | Geaghan et al. |
| 2009/0315841 A1 | 12/2009 | Cheng et al. |
| 2010/0001973 A1 | 1/2010 | Hotelling et al. |
| 2010/0060608 A1 | 3/2010 | Yousefpor |
| 2010/0144391 A1 | 6/2010 | Chang et al. |
| 2010/0149110 A1 | 6/2010 | Gray |
| 2010/0164889 A1 | 7/2010 | Hristov et al. |
| 2010/0188364 A1 | 7/2010 | Lin et al. |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0245286 A1 | 9/2010 | Parker |
| 2010/0253638 A1 | 10/2010 | Yousefpor et al. |
| 2010/0292945 A1 | 11/2010 | Reynolds et al. |
| 2011/0006832 A1 | 1/2011 | Land et al. |
| 2011/0006999 A1 | 1/2011 | Chang et al. |
| 2011/0007030 A1 | 1/2011 | Mo et al. |
| 2011/0025629 A1 | 2/2011 | Grivna et al. |
| 2011/0025635 A1 | 2/2011 | Lee |
| 2011/0050632 A1 | 3/2011 | Lin et al. |
| 2011/0050633 A1 | 3/2011 | Lin et al. |
| 2011/0050634 A1 | 3/2011 | Lin et al. |
| 2011/0242444 A1 | 10/2011 | Song |
| 2011/0248949 A1 | 10/2011 | Chang et al. |
| 2011/0248955 A1 * | 10/2011 | Mo .............. G06F 3/044 345/174 |
| 2011/0284949 A1 | 11/2011 | Meng et al. |
| 2011/0298746 A1 | 12/2011 | Hotelling |
| 2012/0038585 A1 | 2/2012 | Kim |
| 2012/0043971 A1 | 2/2012 | Maharyta |
| 2012/0043977 A1 * | 2/2012 | Kremin .............. G06F 3/0418 324/686 |
| 2012/0044199 A1 | 2/2012 | Karpin et al. |
| 2012/0050214 A1 | 3/2012 | Kremin et al. |
| 2012/0081335 A1 | 4/2012 | Land et al. |
| 2012/0113047 A1 | 5/2012 | Hanauer et al. |
| 2012/0162121 A1 * | 6/2012 | Chang .............. G06F 3/0416 345/174 |
| 2012/0182251 A1 | 7/2012 | Krah |
| 2012/0218199 A1 | 8/2012 | Kim et al. |
| 2012/0306806 A1 | 12/2012 | Yang et al. |
| 2013/0027346 A1 | 1/2013 | Yarosh et al. |
| 2013/0057507 A1 | 3/2013 | Shin et al. |
| 2013/0088372 A1 | 4/2013 | Lundstrum et al. |
| 2013/0154996 A1 | 6/2013 | Trend et al. |
| 2013/0162570 A1 | 6/2013 | Shin et al. |
| 2013/0162583 A1 | 6/2013 | Simmons et al. |
| 2013/0176276 A1 * | 7/2013 | Shepelev .............. G06F 3/044 345/174 |
| 2013/0176280 A1 | 7/2013 | Wu et al. |
| 2013/0181916 A1 | 7/2013 | Huang et al. |
| 2013/0215047 A1 | 8/2013 | Wu et al. |
| 2013/0215053 A1 | 8/2013 | Lin et al. |
| 2013/0215075 A1 | 8/2013 | Lee et al. |
| 2013/0222047 A1 | 8/2013 | Huang et al. |
| 2013/0241870 A1 | 9/2013 | Lin et al. |
| 2013/0249852 A1 | 9/2013 | Lin et al. |
| 2013/0257767 A1 | 10/2013 | Wu et al. |
| 2013/0257797 A1 | 10/2013 | Wu et al. |
| 2013/0299330 A1 | 11/2013 | Tao et al. |
| 2013/0307811 A1 | 11/2013 | Hanssen et al. |
| 2013/0307812 A1 | 11/2013 | Hanssen et al. |
| 2013/0307813 A1 | 11/2013 | Hanssen et al. |
| 2013/0307815 A1 * | 11/2013 | Chang .............. G06F 3/0418 345/174 |
| 2014/0035832 A1 * | 2/2014 | Poulsen .............. G06F 3/041 345/173 |
| 2014/0043279 A1 * | 2/2014 | Pedersen .............. G06F 3/0416 345/174 |
| 2014/0240282 A1 * | 8/2014 | Hwang .............. F21V 15/01 345/174 |
| 2014/0313158 A1 * | 10/2014 | Mo .............. G06F 3/044 345/174 |
| 2014/0375570 A1 * | 12/2014 | Cok .............. G06F 3/0416 345/173 |
| 2015/0091826 A1 * | 4/2015 | Oh .............. G06F 3/0412 345/173 |
| 2015/0102827 A1 * | 4/2015 | Byun .............. G06F 3/044 324/679 |

\* cited by examiner

COMBINING SENSOR ELECTRODES IN A MATRIX SENSOR

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

A proximity sensor device typically includes sensor electrodes that are driven with signals for capacitive sensing. Receiver circuitry receives resulting signals from the sensor electrodes for determining positional information of one or more input objects near the proximity sensor device, if any are present. The receiver circuitry generally has a dynamic range that determines the range of signal strengths of the resulting signals from which meaningful positional information may be derived. If the dynamic range of receiver circuitry is exceeded, meaningful data may not be extracted from signals received as a result of driving the sensor electrode for capacitive sensing. For example, clipping and distortion may occur along the signal path if the amplitude of the received signal exceeds the range limit of the receiver circuitry.

BRIEF SUMMARY OF THE INVENTION

Embodiments described herein include a display device having a capacitive sensing device, a processing system and a method for detecting an input object in a sensing region of a capacitive sensing device, all of which include a plurality of sensor electrodes arranged in a matrix. Each sensor electrode may include one or more common electrodes that are configured for both touch sensing and display updating.

In one embodiment, the processing system includes a sensor module having sensor circuitry configured to drive a first set of the sensor electrodes during a first time period to determine a first aggregate capacitive coupling between the first set of sensor electrodes and an input object. The sensor module is further configured to drive a second set of the sensor electrodes during a second time period to determine a second aggregate capacitive coupling between the second set of sensor electrodes and the input object. The first set and the second set comprise at least one sensor electrode in common and at least one sensor electrode not in common.

In another embodiment, an input device is provided that includes a plurality of sensor electrodes arranged in a matrix, and a processing system coupled to the plurality of sensor electrodes. The processing system is configured to couple to and drive a first set of the sensor electrodes during a first time period to determine a first aggregate capacitive coupling between the first set of sensor electrodes and an input object. The processing system is further configured to couple to and drive a second set of the sensor electrodes during a second time period to determine a second aggregate capacitive coupling between the second set of sensor electrodes and the input object. The first set and the second set comprise at least one sensor electrode in common and at least one sensor electrode not in common. The processing system is configured to determine positional information for the input object based on the first and second aggregate capacitive couplings.

In another embodiment, a method is provided for detecting an input object in a sensing region of a capacitive sensing device having a plurality of sensor electrodes arranged in a matrix. The method includes driving a first set of a plurality of sensor electrodes during a first time period to determine a first aggregate capacitive coupling between the first set of sensor electrodes and an input object. The method further includes driving a second set of the plurality of sensor electrodes during a second time period to determine a second aggregate capacitive coupling between the second set of sensor electrodes and the input object. The first set and the second set comprise at least one sensor electrode in common and at least one sensor electrode not in common. The method includes determining positional information for the input object based on the first and second aggregate capacitive couplings.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
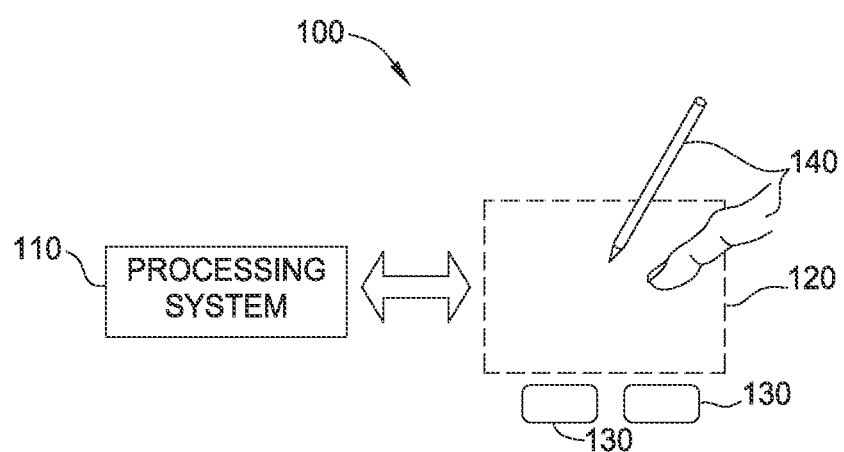
FIG. 1 is a block diagram of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. Various embodiments of the present invention provide input devices and methods for improving signal detection by receiver circuitry coupled to sensor electrodes. In one embodiment, an electrode matrix integrated into a display panel of an input device may be comprised of a plurality of sensor electrodes used for capacitive sensing. Multiple sensor electrodes may be programmatically combined into a single larger sensor electrode when driven for absolute capacitance sensing. Combining multiple sensor electrodes changes the effective area of the sensor electrode(s) that are driven and thereby changes the strength of the resulting signal received as a result of driving the sensor electrodes for capacitive sensing.

Although a small sensor electrode area is preferred to limit the amplitude of the resulting signal for transcapacitance sensing (i.e., as used for touch sensing), the larger sensor electrode area can provide an increased signal amplitude to detect otherwise low signals against inherent noise and resolution limits of the receiver circuitry when performing proximity sensing to detect an input object, such as a hovering finger. This ability to change the strength of the resulting signal expands the total effective dynamic range corresponding to the sensor electrodes, allowing desirable signals to be detected in a wider range of conditions than if the sensor electrodes were driven alone. In one example, this ability to expand the dynamic range allows an input device that includes the sensor matrix to detect input objects at a wider range of distances from the sensor electrode than if the sensor electrode was not combined with other sensor electrodes.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional"

positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
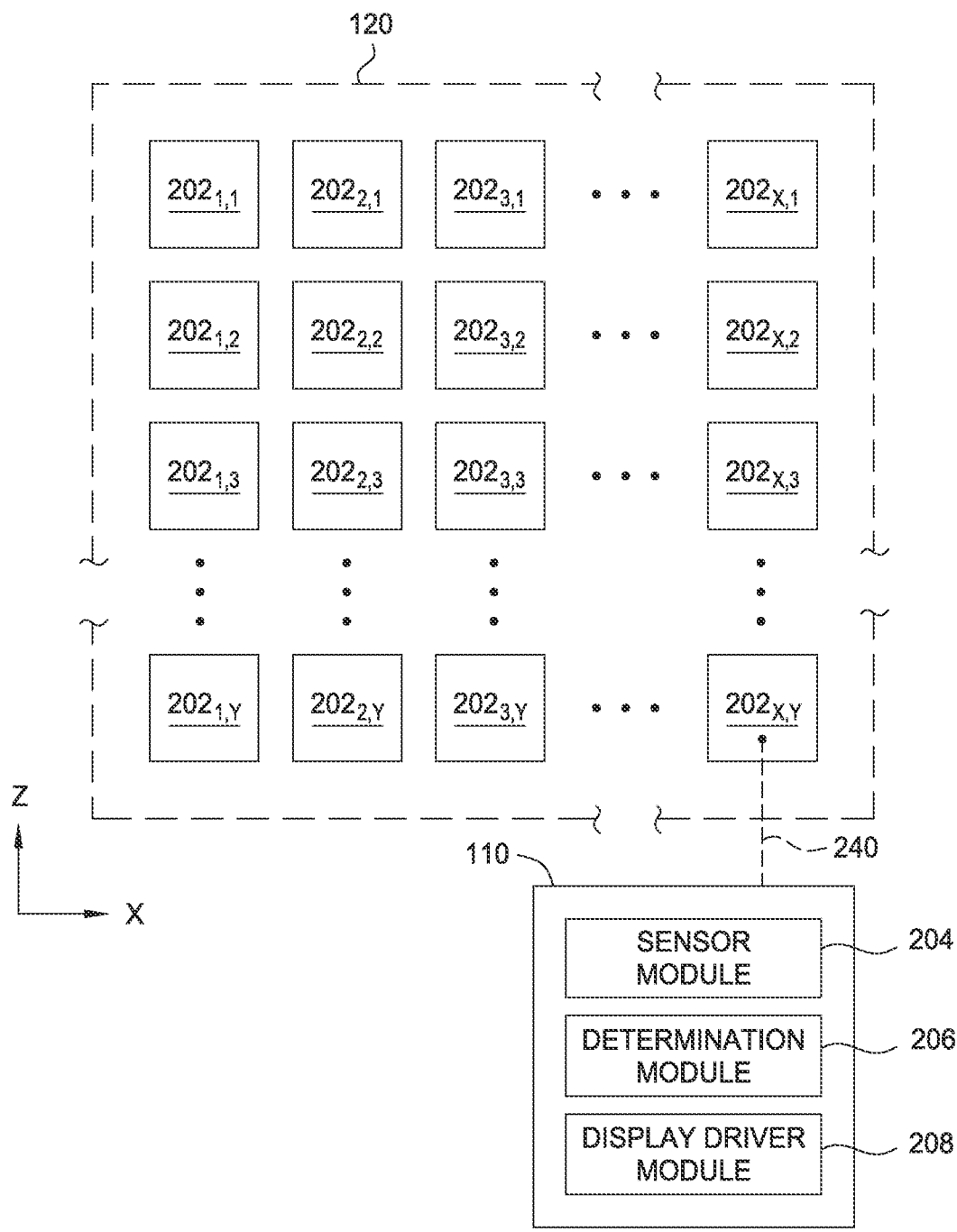
FIG. 2 illustrates a simplified exemplary array of sensor elements that may be used in the input device of FIG. 1, according to one embodiment described herein.

FIG. 2 shows a portion of an exemplary pattern of sensing electrodes 202 configured to sense in the sensing region 120 associated with the pattern, according to some embodiments. For clarity of illustration and description, FIG. 2 shows the sensor electrodes 202 in a pattern of simple rectangles and does not show various other components. The exemplary pattern comprises an array of sensor electrodes $202_{X,Y}$ (referred collectively as sensor electrodes 202) arranged in X columns and Y rows, wherein X and Y are positive integers, although one of X and Y may be zero. While the sensor electrodes are depicted as being arranged in a columns and rows, it is contemplated that the pattern of sensing electrodes 202 may comprise a plurality of sensor electrodes 202 having other configurations, such as polar arrays, repeating patterns, non-repeating patterns, non-uniform arrays, a single row or column, or other suitable arrangement. Further, one or more of the sensor electrodes 202 may be offset from the other. Moreover, the sensor electrodes 202 may be any shape such as circular, rectangular, diamond, star, square, etc. In one embodiment, the sensor electrodes 202 may have a common shape and size. The sensor electrodes 202 are coupled to the processing system 110 and utilized to determine the presence (or lack thereof) of an input object 140 in the sensing region 120.

In one mode of operation, at least a portion of the arrangement of sensor electrodes 202 may be utilized to detect the presence of an input object via absolute sensing techniques. That is, processing system 110 is configured to drive each sensor electrode 202 with an absolute capacitive sensing signal (modulated signal) and measure a capacitance between the sensor electrode 202 and the input object (e.g., free space or earth ground) based on the modulated signal, which is utilized by the processing system 110 or other processor to determine the position of the input object.

The sensor electrodes 202 are typically ohmically isolated from each other. That is, one or more insulators separate the sensor electrodes 202 and prevent them from electrically shorting to each other.

In another mode of operation, at least a portion of the sensor electrodes 202 may be split into groups of transmitter and receiver electrodes utilized to detect the presence of an input object via transcapacitive sensing techniques. That is, processing system 110 may drive a first group of sensor electrodes 202 with a transmitter signal and receive resulting signals with the second group of sensor electrodes 202, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operatively switch between any two or more of the modes described above.

The areas of localized capacitance (capacitive coupling) may be termed "capacitive pixels." Capacitive pixels may be formed between an individual sensor electrode 202 and ground in the first mode of operation and between groups of sensor electrodes 202 used as transmitter and receiver electrodes in the second mode of operation. The capacitive coupling changes with the proximity and motion of input objects 140 in the sensing region 120 associated with the sensing electrodes 202, and thus may be used as an indicator of the presence of the input object in the sensing region of the input device 100.

In some embodiments, the sensor electrodes 202 are "scanned" to determine measurements that correspond to the capacitive couplings between transmitter and receiver electrodes. That is, in one embodiment, one or more of the sensor electrodes 202 are driven to transmit transmitter signals. Transmitters may be operated such that one transmitter electrode transmits at one time, or multiple transmitter electrodes transmit at the same time. In one embodiment, where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 202 configured as receiver sensor electrodes may be operated singly or multiply to acquire resulting signals. The resulting signals may be used to determine measurements of the capacitive couplings at the capacitive pixels.

In other embodiments, "scanning" sensor electrodes 202 to determine these capacitive couplings comprises driving with an absolute capacitive sensing signal and measuring the absolute capacitance of one or more of the sensor electrodes. In another embodiment, the sensor electrodes may be operated such that more than one sensor electrode is driven at a time, or multiple sensor electrodes are driven at the same time. In such embodiments, an absolute capacitive measurement may be obtained from each of the one or more sensor electrodes 202 simultaneously. In one embodiment, the input device 100 simultaneously drives a plurality of the sensor electrodes 202 and measures an absolute capacitive measurement for each of the driven electrodes 202 in the same sensing cycle. In various embodiments, processing system 110 may configured to selectively drive and receive with a portion of sensor electrodes 202. For example, the sensor electrodes may be selected based on, but not limited to, an application running on the host processor, a status of the input device, an operating mode of the sensing device, and a determined location of an input device.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 120. The background capacitance changes with the environment and operating conditions, and may be estimated in various ways. For example, some embodiments take "baseline images" when no input object is determined to be in the sensing region 120, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 202 comprise one or more display electrodes used in updating the display of the display screen. In one or more embodiments, the display electrodes comprise one or more segments of a Vcom electrode (common electrodes), a source drive line, a gate line, an anode electrode or cathode electrode, or any other display element. These display electrodes may be disposed on an appropriate display screen substrate. For example, the display electrodes may be disposed on the transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. (for OLEDs, the substrate may not be transparent). In such embodiments, the display electrode can also be referred to as a "combination electrode", since it performs multiple functions. In various embodiments, each of the sensor electrodes 202 comprises one or more common electrodes. In other embodiments, at least two sensor electrodes 202 may share at least one common electrode. While the following description may describe that sensor electrodes 202 comprise one or more common electrodes, various other display electrodes as described above may also be used in conjunction with the common electrode or as an alternative to the common electrodes. In various embodiments, the sensor electrodes 202 may comprise the entire common electrode layer (Vcom electrode).

Continuing to refer to FIG. 2, the processing system 110 coupled to the sensing electrodes 202 includes a sensor module 204, a determination module 206, and optionally, a display driver module 208. In one embodiment, the sensor module 204 comprises circuitry ("sensor circuitry") configured to drive a transmitter signal or a modulated signal onto and receive resulting signals from the sensing electrodes 202 during periods in which input sensing is desired. In one embodiment, the sensor module 204 comprises a transmitter module including circuitry configured to drive a transmitter signal onto the sensing electrodes 202 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 120. The absolute capacitive sensing signal used in absolute capacitive sensing may be the same or different from the transmitter signal used in transcapacitive sensing. The sensor module 204 may be selectively coupled to one or more of the sensor electrodes 202. For example, the sensor module 204 may be coupled to selected portions of the sensor electrodes 202 and operate in either an absolute or transcapacitive sensing mode. In another example, the sensor module 204 may be coupled to a different portion of the sensor electrodes 202 and operate in either an absolute or transcapacitive sensing mode. In yet another example, the sensor module 204 may be coupled to all the sensor electrodes 202 and operate in either an absolute or transcapacitive sensing mode. Finally, in another embodiment, the sensor module 204 may be coupled one or more of the sensor electrodes 202 and operate in a mode that simultaneously performs transcapacitive sensing and absolute capacitive sensing.

In various embodiments, the sensor module 204 may comprise a receiver module that includes circuitry configured to receive a resulting signal with the sensing electrodes 202 comprising effects corresponding to the transmitter signal during periods in which input sensing is desired. In one or more embodiments, the receiver module is configured to drive an absolute capacitive sensing signal onto a sensor electrode 202 and receive a resulting signal corresponding to the modulated signal to determine changes in absolute capacitance of the sensor electrode 202. In various embodiments, the receiver module is configured to receive resulting signals with sensor electrode 202 while the sensor electrode 202 is driven by an element external to the receiver module 204. As a further example, the receiver module could drive a modulated voltage onto a sensor electrode 202 and receive a resulting modulated current from the sensor electrode 202 in response. The receiver module may determine a position of the input object 140 in the sensing region 120 or may provide a signal including information indicative of the resulting signal to another module or processor, for example, a determination module 206 or a processor of the electronic device (i.e., a host processor), for determining the position of the input object 140 in the sensing region 120. In one or more embodiments, the receiver module comprises a plurality of receiver channels, where each receiver channel may be an analog front end (AFE) channel configured to modulate a corresponding sensor electrode and measure changes in capacitance between the corresponding sensor electrode 202 and an input object. In one embodiment, the receiver channel may include circuitry configured to measure an amount of charge needed to hold a sensor electrode 202 at a particular voltage with respect to a reference voltage, such as ground, a voltage between ground and a positive supply voltage, or other voltages. In one embodiment, the receiver channels may be further configured to drive one or more sensor electrodes with a capacitive sensing signal. Each of the receiver channels may be selectively coupled to one or more sensor electrodes 202 with selection circuitry such as one or more multiplexers.

As discussed above, when a sensor electrode 202 is driven for capacitive sensing, a receiver module within sensor module 204 receives resulting signals that correspond to the presence and position of an input object 140 in sensing region. In some embodiments, the sensor module 204 drives a sensor electrode 202 to a particular voltage level, and measures (i.e., integrate) the current required to do so. The strength (e.g., voltage level or current level) of the resulting signal depends on the presence and proximity of an input object 140 as well as the area of the sensor electrode(s) 202 that is driven for capacitive sensing. The receiver module may have a particular operating range, which is a range of strengths of resulting signals (e.g., voltage or current levels) that allows processing system 110 to derive meaningful information about the input object 140. For example, in embodiments where the sensor circuitry for transcapacitance sensing includes an operational amplifier for receiving resulting signals, the operating range is the range of signal strengths (e.g., voltages) of resulting signals that maintains the operational amplifier in a linear operating range.

As such, in many embodiments, a smaller electrode area is preferred for sensor electrodes operated to detect an input object in a first portion of sensing region 120 (i.e., touching or in close proximity to input device 100) to limit the amplitude of the received resulting signal to within the operating range, which avoids clipping and distortion of the signal within the sensor circuitry. In contrast, when the sensor electrodes are operated to detect an input object in a second portion of sensing region 120 as a higher signal amplitude is needed to detect more distant objects (e.g., a hovering finger), and hence a larger electrode area is preferred in these cases. The first portion of sensing region 120 is located between an input surface of input device 100 and the second portion of sensing region 120.

Accordingly, in one or more embodiments, the sensor module 204 is configured to programmatically combine multiple sensor electrodes 202 into, effectively, a single larger sensor electrode for absolute capacitance sensing, as well as transcapacitive sensing. Increasing the (aggregate) area of the sensor electrodes 202 that are driven for capacitive sensing increases the strength of the resulting signal received by receiver circuitry for absolute capacitance sensing. As such, the same sensor electrodes 202 sized to perform within a particular operating range for transcapacitance sensing may be used for improved absolute capacitance sensing techniques, as described herein, without requiring the actual sensor electrodes to be made larger.

In one embodiment, the sensor module 204 may use a multiplexor to electrically connect multiple sensor electrodes into a single sensor electrode. In the example depicted in FIG. 2, the sensor module 204 may be selectively coupled to a set of sensor electrodes that includes at least one of the sensor electrodes $202_{2,2}$, $202_{3,2}$, $202_{2,3}$, and $202_{3,3}$ to operate the set together for absolute capacitance sensing. In another embodiment, the sensor module 204 may sum the resulting signals from the multiple sensor electrodes after a current conveyor front end. In another embodiment, the sensor module 204 may sum the resulting signals in the digital domain.

Sensor module 204 may select a number of sensor electrodes 202 driven for absolute capacitive sensing based on a desired signal gain and on a desired sensor pitch and sensing resolution. In one mode of operation, sensor module 204 selects and drives a particular (first) set of sensor electrodes 202 during a first time period to determine a (first) aggregate capacitive coupling between the first set of sensor electrodes and an input object (e.g., a finger). The sensor module 204 then selects and drives another (second) set of sensor electrodes 202 during a second time period to determine a (second) aggregate capacitive coupling between the second set of sensor electrodes 202 and the input object. As described in greater detail below, the different sets of sensor electrodes may be selected such that the first set and the second set include at least one sensor electrode in common and at least one sensor electrode not in common. The determination module 206 (or another module in processing system 110 or the electronic system) determines positional information for the input object based on the first and second aggregate capacitive couplings.

For instance, using the example sensor electrode pattern shown in FIG. 2, the sensor module 204 selects a first set of sensor electrodes comprising a 2×2 pattern of sensor electrodes $202_{1,2}$, $202_{2,2}$, $202_{1,3}$, $202_{2,3}$, and a second set of sensor electrodes comprising another 2×2 pattern of sensor electrodes $202_{2,2}$, $202_{3,2}$, $202_{2,3}$, and $202_{3,3}$. As used herein, an "N×M" set generally refers to a set of sensor electrodes comprised of N units of sensor electrodes wide and M units of sensor electrodes tall. The first and second set of sensor electrodes may be selected such that the second set of sensor electrodes is offset from the first set of sensor electrodes by 1-unit of sensor electrodes. As such, the first set and second set have at least one sensor electrode in common (e.g., sensor electrodes $202_{2,2}$ and $202_{2,3}$) and at least one sensor electrode not in common (e.g., sensor electrodes $202_{1,2}$, $202_{1,3}$, $202_{3,2}$, $202_{3,3}$).

By enabling the 2×2 sets in sequence to overlap by 1-unit of sensor electrodes, the sensor module 204 can perform absolute capacitive sensing of the entire sensing region 120 using aggregated 2×2 sensor electrodes at a 1-unit spacing. That is, the sensor module 204 selects sequential sets of sensor electrodes having a particular window size (e.g., N×M) based on a desired signal gain and at a particular step size (e.g., 1-unit spacing) based on a desired effective resolution for capacitive sensing. While embodiments having a 2×2 window size and a 3×3 window size are shown and discussed in detail herein, it is recognized that any size of window may be used, and the size of window may vary during operation of the input device 100. The configuration of the sensor module 204 includes the size, position, and coupling of the multiple sensor electrodes 202 to sensor module 204. Many such arrangements are possible. Example arrangements are illustrated in and described with respect to FIG. 3 and FIG. 4.

In various embodiments, capacitive sensing and display updating may occur during at least partially overlapping periods. For example, as a display electrode is driven for display updating, the display electrode may also be driven for capacitive sensing. Overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, where such periods when capacitive sensing occurs are also referred to as non-display update periods. In various embodiments, the non-display update periods may occur between display line update periods for two display lines of a display frame and may be at least as long in time as the display update period of one display line. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 202 for capacitive sensing during any one or more of or any combination of the different non-display update times.

The display driver module 208 includes circuitry configured to provide display image update information to the display of a display device during non-sensing (e.g., display updating) periods. The display driver module 208 may be included in or separate from the processing system 110. In one embodiment, the processing system 110 comprises a first integrated controller comprising the display driver module 208 and at least a portion of the sensor module 204 (i.e., transmitter module and/or receiver module). In another embodiment, the processing system comprises a first integrated controller comprising the display driver 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

As discussed above, the sensor electrodes 202 may be formed as discrete geometric forms, polygons, bars, pads, lines or other shape, which are ohmically isolated from one another. The sensor electrodes 202 may be electrically coupled through circuitry to form electrodes of having larger plan area relative to a discrete one of the sensor electrodes 202. The sensor electrodes 202 may be fabricated from opaque or non-opaque conductive materials. In embodiments wherein the sensor electrodes 202 are utilized with a display device, it may be desirable to utilize non-opaque conductive materials for the sensor electrodes 202. In embodiments wherein the sensor electrodes 202 are not utilized with a display device, it may be desirable to utilize opaque conductive materials having lower resistivity for the sensor electrodes 202 to improve sensor performance. Materials suitable for fabricating the sensor electrodes 202 include ITO, aluminum, silver, copper, and conductive carbon materials, among others. The sensor electrodes 202 may be formed as contiguous body of conductive material having little or no open area (i.e., having a planar surface uninterrupted by holes), or may alternatively be fabricated to form a body of material having openings formed therethrough. For example, the sensor electrodes 202 may be formed a mesh of conductive material, such as a plurality of interconnected thin metal wires. In one embodiment, at least one of the length and width of the sensor electrodes 202 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, on various embodiments, the sensor electrodes 202 may comprise a center to center pitch in the range of about 4 to about 5 mm; however, in other embodiments, the pitch may be less than about 4 mm or greater than about 5 mm. Further, in various embodiments the sensor electrode comprises the entire Vcom electrode (common electrode(s)).

Figure 3:
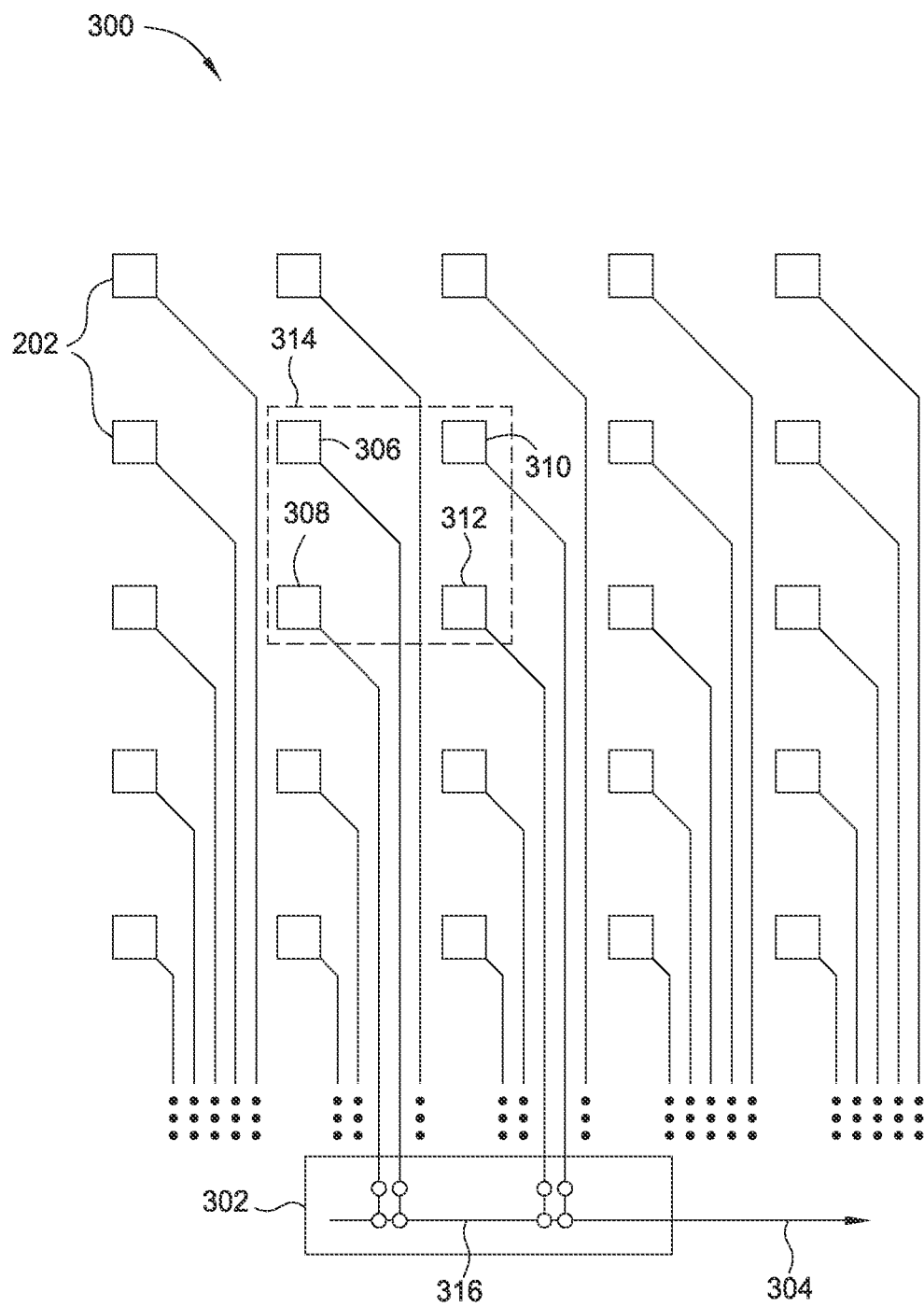
FIG. 3 is a simplified schematic plan view of a portion of the input device comprising a plurality of sensor electrodes configured for a combinative mode of operation, according to one embodiment of the present disclosure.

FIG. 3 is a simplified schematic plan view of a portion 300 of the input device 100 comprising a plurality of sensor electrodes 202 configured for a combinative mode of operation, according to one embodiment of the present disclosure. The sensor electrodes 202 in the portion 300 are arranged in a "waffle" pattern for illustrative purposes; other arrangements of sensor electrodes 202 may be used. In one embodiment, a plurality of sensor electrodes 306, 308, 310, 312 (i.e., a set) are configured to be selectively coupled to a receiver channel 304 using a multiplexor 302. In one implementation, the multiplexor 302 includes pass transistor logic comprising a transmission gate multiplexor. Other circuit components may be used. Though not illustrated, other sensor electrodes 202 in the portion 300 may be coupled to other receiver channels in a similar fashion, for example, with a 4:1 sensor electrode to receiver ratio.

Under a normal mode of operation, the receiver channel 304 can selectively connect to sensor electrode 306 using the multiplexor 302, then to sensor electrode 308, then sensor electrode 310, and then sensor electrode 312 individually, which allows the sensor module 204 to scan all sensor electrodes. In another mode of operation, the multiplexor 302 is configured to electrically connect all the sensor electrodes 306, 308, 310, 312 simultaneously to operate the set as a single 2×2 sensor electrode 314 having an area equal to the areas of the sensor electrodes 306, 308, 310, and 312 combined. Using the multiplexor 302, the resulting signals from the sensor electrodes 306, 308, 310, and 312 are combined at an output bus 316 to yield a higher resulting signal corresponding to a distant input object than otherwise received individually from the sensor electrodes. The receiver channel 304 selects and drives the set of sensor electrodes 306, 308, 310, 312 during a given time period to determine an aggregate capacitive coupling between the set of sensor electrodes 306, 308, 310, 312 and an input object (e.g., a finger).

Figure 4:
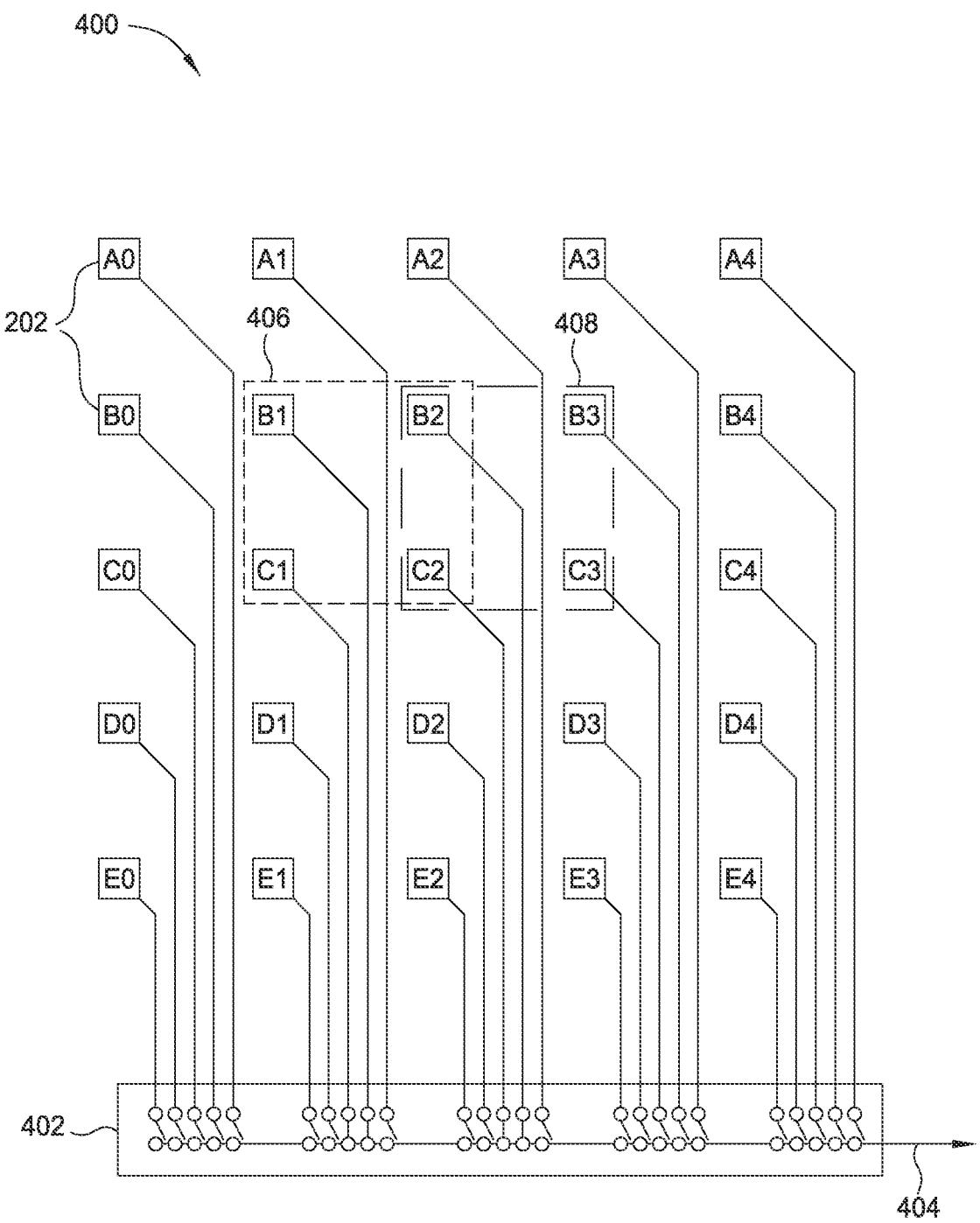
FIG. 4 is a simplified schematic plan view of a portion of the input device comprising a plurality of sensor electrodes configured for a combinative mode of operation, according to another embodiment of the present disclosure.

FIG. 4 is a simplified schematic plan view of a portion 400 of the input device comprising a plurality of sensor electrodes 202 configured for a combinative mode of operation, according to another embodiment of the present disclosure. The sensor electrodes 202 of the portion 400 (identified as A0 to A4, B0 to B4, . . . , E0 to E4) are configured to be selectively coupled to a receiver channel 404 of the sensor module 204 using a multiplexor 402. The sensor electrodes 202 of the portion 400 are similar to the portion 300 shown in FIG. 3, except that the multiplexor 402 is connected to additional (e.g., twenty-one more) sensor electrodes. The additional sensor electrodes enable the sensor module 204 to define a sensing "window" within the portion 400, by selecting less than all of the sensor electrodes at a time (e.g., less than the twenty-five sensor electrodes in the portion 400). While a single multiplexor 402 is depicted in the embodiment shown in FIG. 4, it is recognized that more than one multiplexor may be used. The multiplexor(s) may be internal to the sensor module 204 of the processing system 110, or in other embodiments, external to the sensor module 204 of the processing system 110, or in yet other embodiments, external to the processing system 110.

In one or more embodiments, the sensor module 204 selects (e.g., using the multiplexor 402) a number of sensor electrodes 202 driven simultaneously for absolute capacitive sensing based on a desired signal gain. The sensor module 204 may determine how many sensor electrodes 202 are to be driven simultaneously based on a proportional relationship between the total area of the sensor electrodes and the resulting signal gain. For example, the sensor module 204 may select and drive a 3×3 set of sensor electrodes (e.g., sensor electrodes A0, A1, A2, B0, B1, B2, C0, C1, C2) to achieve a greater signal gain for the resulting signal corresponding to an input object than would be achieved driving a 2×2 set of sensor electrodes (e.g., sensor electrodes A0, A1, B0, B1). In some embodiments, the sensor module 204 modifies the number of sensor electrodes driven simultaneously based on a comparison of a prior resulting signal and a particular threshold level. In one scenario, the sensor module 204 might increase the number of sensor electrodes driven (i.e., increase the window size) based a determination that a prior resulting signal failed to meet a particular threshold. In other embodiments, the sensor module 204 may select a particular number of sensor electrodes to be driven simultaneously to achieve a desired sensor pitch, as described in greater detail below.

In one embodiment, the sensor module 204 is configured to determine a step size between sets of sensor electrodes driven simultaneously in sequential time periods based on a desired sensing resolution. Generally, a higher step size may be selected to achieve a lower effective sensor pitch and a lower sensing resolution, while a lower step size may be selected to achieve a higher effective sensor pitch and a higher sensing resolution. The sensor module 204 uses the determined step size to select which of the sensor electrodes 202 are driven together from one sensing period to the next. The sensor module 204 may select, during a given time period, a set of sensor electrodes that are offset from the set of sensor electrodes driven in a previous time period by an amount of the determined step size.

For instance, in the example sensor electrode pattern shown in FIG. 4, the receiver channel 404 can connect to, using the multiplexor 402, a combined 4-electrode (2×2) sensor electrode composed of any of: {A0, A1, B0, B1}, {A1, A2, B1, B2}, {A2, A3, B2, B3}, {A3, A4, B3, B4}, {B0, B1, C0, C1}, {B1, B2, C1, C2}, . . . {D3, D4, E3, E4}. In one scenario, the receiver channel 404 may be selectively coupled to the combined sensor electrode 406 composed of sensor electrodes B1, B2, C1, C2 during one time period, and in another time period, selectively coupled to the combined sensor electrode 408 composed of sensor electrodes B2, B3, C2, C3. Assuming other receiver channels are wired similarly, this allows the entire sensor to be scanned using 2×2 electrodes at a 1-unit spacing. While these examples depict lateral scanning of sequential sets, it should be recognized that any direction of scanning, including direction of offsets or overlap, may be used.

In another example, this time with a step size of 2 and a larger window size, the receiver channel 404 can use the multiplexor 402 to connect to a combined 9-electrode (3×3) sensor electrode composed of the set {A0, A1, A2, B0, B1, B2, C0, C1, C2} during one time period, and then in another time period, connect to a different combined 3×3 sensor electrode composed of the set {A2, A3, A4, B2, B3, B4, C2, C3, C4}. In these scenarios, the change in step size results in two combined 3×3 sensor electrodes effectively existing within the portion 400, in contrast to the four combined 2×2 sensor electrodes effectively existing within the portion 400.

In one embodiment, using the determined step size, the sensor module 204 may select, during a given time period, sensor electrodes that are additional to a set of sensor electrodes driven in a previous time period so as to maintain a substantially constant centroid (i.e., geometric center) position of the previous set of sensor electrodes. In some embodiments, the sensor module 204 may select additional sensor electrodes in symmetrical groups (relative to the centroid) or in a spiral order moving out from the centroid, by an amount of the determined step size. For example, the receiver channel 404 may be selectively coupled to the combined sensor electrode 406 composed of sensor electrodes B1, B2, C1, C2 during one time period, and in another time period, be additionally coupled to the sensor electrodes A1, B3, D2, and C0 (in sum, composed of A1, B1, B2, B3, C0, C1, C2, D2).

The step size may be characterized as (inversely) proportional to the effective sensing resolution achieved during capacitive sensing. As such, the effective pitch of the sensor electrodes 202 can be altered by electrically connecting different sets of multiple sensor electrodes to dynamically form combined sensor electrodes. In some cases, the sensor module 204 may selectively couple and drive a particular number of sensor electrodes 202 to sense at a high pitch with a fine sensing resolution. In other cases, the sensor module 204 may selectively couple and drive another number of sensor electrodes 202 to sense at a low pitch with a coarser sensing resolution. Geometrically, the distance that field lines coming out from the sensor electrodes extend from the electrodes is proportional to the sensor pitch. As such, to sense proximity of an input object at a far distance from the input device 100, the sensor module 204 may operate to achieve a coarser pitch with larger combined sensor electrodes that boost the resulting signal to a level sufficient to determining positional information of the input object.

Figure 5:
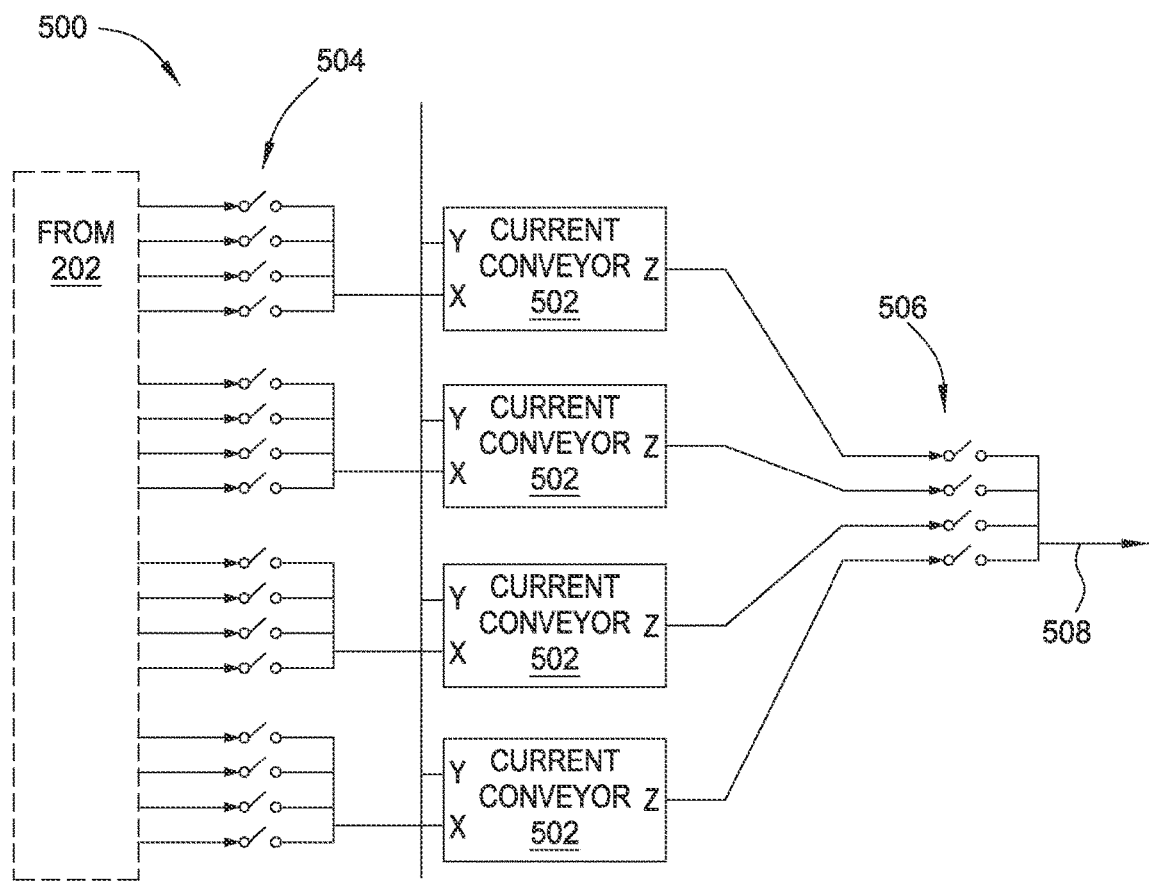
FIG. 5 is a block diagram depicting a simplified schematic plan view of circuitry connected to a plurality of sensor electrodes configured for a combinative mode of operation, according to one embodiment of the present disclosure.

FIG. 5 is a block diagram depicting a simplified schematic plan view of circuitry 500 connected to a plurality of sensor electrodes configured for a combinative mode of operation, according to one embodiment of the present disclosure. According to one or more embodiments, the circuitry 500 is configured to programmatically combine sensor electrodes 202 into a larger sensor electrode for absolute capacitive sensing by summing the resulting signal received from the sensor electrodes after a current conveyor component 502. This described embodiment may be particularly useful in cases where the number of possible sets of sensor electrodes exceeds the number of available receiver channels (e.g., analog front ends), as in the case of larger sensor patterns.

In one embodiment, the circuitry 500 includes a first plurality of multiplexors 504 coupled to the plurality of sensor electrodes 202 and to a plurality of current conveyors 502. Each multiplexor 504 is coupled to a particular set of sensor electrodes. In the example shown, each multiplexor 504 is coupled to a set of four sensor electrodes (i.e., 4:1 ratio) which may form a combined 2×2 larger sensor electrode, although other arrangements are contemplated. The resulting signals received from the sensor electrodes 202 are combined by the respective multiplexors 504 into inputs for the corresponding current conveyors 502. A current conveyor 502 comprises electrical components configured to convert an input current (at a terminal designated "X") into one or more scaled output currents (at a terminal designated "Z"), although other configurations or implementations of a current conveyor may be used. The circuitry 500 further includes a second multiplexor 506 coupled to the outputs of the current conveyors 502. The second multiplexor 506 is configured to combine the outputs of the current conveyors 502 and provide the combined signal to a receiver channel 508 of the sensor module 204.

In an alternative implementation, the current conveyors 502 may instead have multiple outputs, and these outputs can be combined into multiple sums. For example, in an alternative embodiment having current conveyors with two outputs: the first output of each current conveyor 502 feeds into a first receiver channel 508 as normal, and the second output of each current conveyor 502 feeds into a second receiver channel (e.g., analog front end). That is, the first output of each conveyor is coupled to a separate receiver channel and the second output from at least two separate current conveyors are coupled to a common, second receiver channel. The second receiver channel is configured to accumulate the multiplexor in connection with a first, second, third, and fourth sensor electrode 202, thereby providing a same output as if the second receiver channel had been connected to all four sensor electrodes simultaneously. This alternative implementation enables the sensor module 204 to receive the individual results (e.g., resulting signals from sensor electrodes driven individually) while simultaneously receiving the sum results (e.g., resulting signals from a combined sensor electrode). This configuration may be extended to provide a hierarchy of results, including 1×1, 2×2, . . . and so on (e.g., up to 32×32) results, to the sensor module 204.

Figure 6:
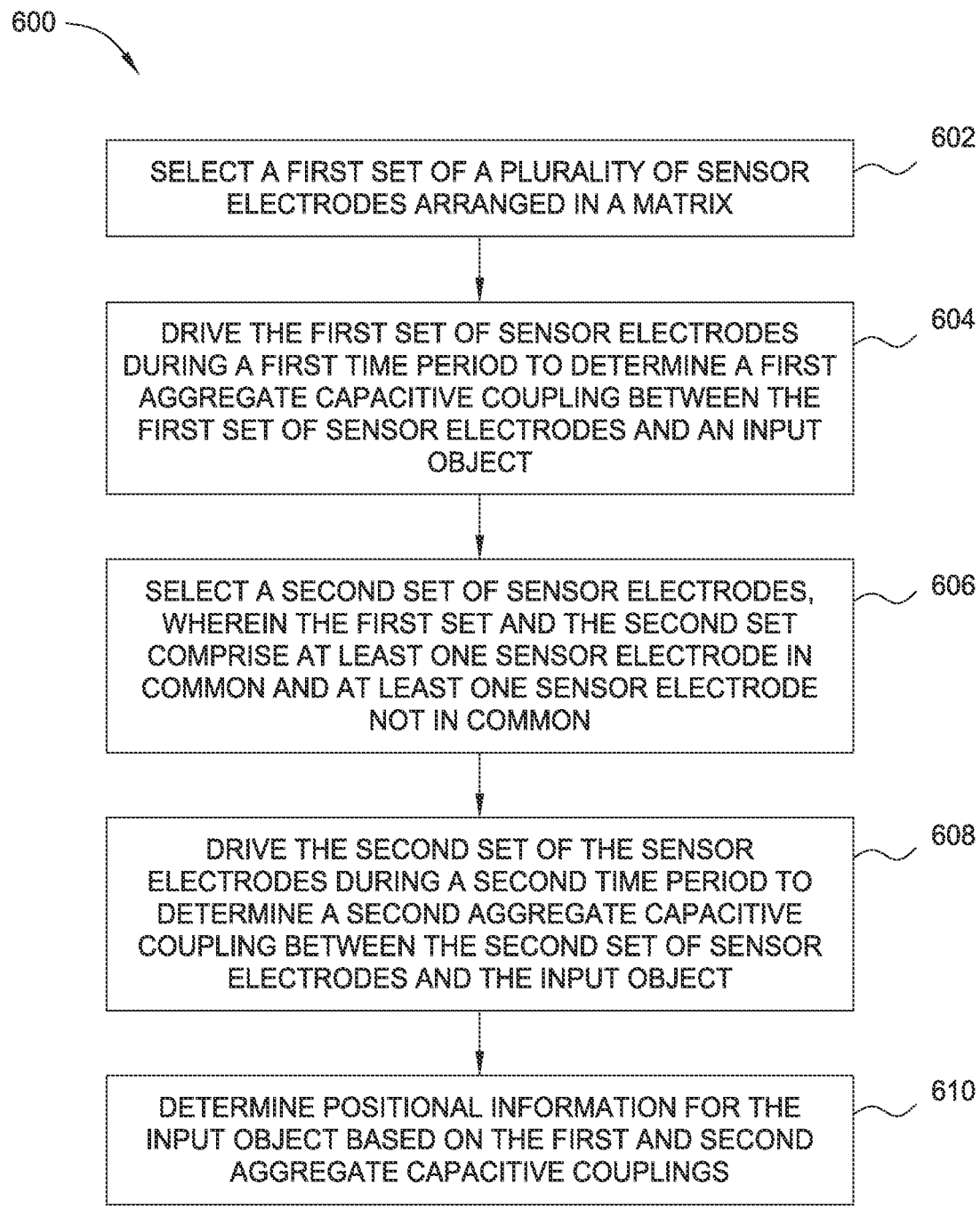
FIG. 6 is a flow diagram of a method for detecting an input object in a sensing region of a capacitive sensing device, according to one embodiment of the present disclosure.

FIG. 6 is a flow diagram of a method 600 for detecting an input object in a sensing region of a capacitive sensing device, according to one embodiment of the present disclosure. The capacitive sensing device may include a plurality of sensor electrodes arranged in a matrix. In some embodiments, each sensor electrode may comprise one or more common electrodes that are configured for both touch sensing and display updating.

The method 600 begins at step 602, where the processing system 110 (e.g., by operation of the sensor module 204) selects a first set of the plurality of sensor electrodes 202 for performing absolute capacitive sensing. At step 604, the processing system 110 drives the first set of the plurality of sensor electrodes during a first time period to determine a first aggregate capacitive coupling between the first set of sensor electrodes and an input object. In some embodiments, the aggregate capacitive coupling is determined from resulting signals received on the individual sensor electrodes in the first set and combined using a multiplexor that programmatically combines the set of sensor electrodes into a single larger sensor electrode.

At step 606, the processing system 110 selects a second set of the plurality of sensor electrodes such that the first set of sensor electrodes and the second set of sensor electrodes comprise at least one sensor electrode in common and at least one sensor electrode not in common. In some embodiments, the first set and the second set of sensor electrodes comprise at least two sensor electrodes in common. In other embodiments, the first set and the second set of sensor electrodes comprise at least three sensor electrodes in common. In some cases, the first set and the second set of sensor electrodes comprise no sensor electrodes in common.

In one embodiment, the sensor module 204 selectively couples the first set of sensor electrodes to the sensor module 204 based on a window size comprising a number of sensor electrodes. The sensor module 204 may then selectively couple the second set of sensor electrodes to the sensor module 204 based on the window size and based on a step size associated a number of sensor electrodes in common between the first set and the second set.

At step 608, the processing system 110 drives the second set of the plurality of sensor electrodes during a second time period to determine a second aggregate capacitive coupling between the second set of sensor electrodes and the input object. The second aggregate capacitive coupling may be determined based on resulting signals received on the individual sensor electrodes of the second set, and combined, for example, by a multiplexor.

In some embodiments, the processing system 110 drives a third set of the sensor electrodes during a third time period to determine a third aggregate capacitive coupling between the third set of sensor electrodes and the input object. The third set of sensor electrodes may be selected such that the second set and the third set of sensor electrodes have at least one sensor electrode in common. In some embodiments, the processing system 110 drives the first set and the second set of sensor electrodes simultaneously during a fourth time period At step 610, the processing system 110 (e.g., by operation of the determination module 206) determines positional information for the input object in a sensing region of the capacitive sensing device based on the first and second aggregate capacitive couplings.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for an input device, the input device having a plurality of sensor electrodes arranged in a matrix, the processing system comprising:
a sensor module having sensor circuitry configured to:
drive a first set of the sensor electrodes during a first time period to determine a first aggregate capacitive coupling between the first set of sensor electrodes and an input object, the first aggregate capacitive coupling determined based on resulting signals received on individual sensor electrodes of the first set of the sensor electrodes;
drive a second set of the sensor electrodes during a second time period to determine a second aggregate capacitive coupling between the second set of sensor electrodes and the input object, the second aggregate capacitive coupling determined based on resulting signals received on individual sensor electrodes of the second set of the sensor electrodes, wherein the first set and the second set comprise at least one sensor electrode in common and at least one sensor electrode not in common; and
drive a third set of the sensor electrodes during a third time period to determine a third aggregate capacitive coupling between the third set of the sensor electrodes and the input object, wherein the third time period and the second time period at least partially overlap.

2. The processing system of claim 1, wherein the first set and the second set comprise at least two sensor electrodes in common.

3. The processing system of claim 1, wherein the sensor module is further configured to:
selectively couple the first set of sensor electrodes to the sensor module based on a window size comprising a number of sensor electrodes; and
selectively couple the second set of sensor electrodes to the sensor module based on the window size and based on a step size associated with a number of sensor electrodes in common between the first set and the second set.

4. The processing system of claim 1, wherein the sensor module is further configured to:
drive a fourth set of the sensor electrodes during a fourth time period to determine a fourth aggregate capacitive coupling between the fourth set of the sensor electrodes and the input object, wherein the second set and the fourth set have at least one sensor electrode in common.

5. The processing system of claim 1, wherein the sensor module is further configured to:
drive the first set and the second set of sensor electrodes simultaneously during a fourth time period.

6. The processing system of claim 1, wherein the sensor module further comprises a first receiver channel configured to be selectively coupled to the first set and the second set of sensor electrodes via a plurality of current conveyors.

7. The processing system of claim 1, wherein the sensor module further comprises a first receiver channel configured to be selectively coupled to the first set and the second set of sensor electrodes via a multiplexor.

8. An input device comprising:
a plurality of sensor electrodes arranged in a matrix comprising N rows having at least two sensor electrodes per row and M columns having at least two sensor electrodes per column;
a processing system coupled to the plurality of sensor electrodes, the processing system configured to:
couple to and drive a first set of the sensor electrodes during a first time period to determine a first aggregate capacitive coupling between the first set of sensor electrodes and an input object, the first aggregate capacitive coupling determined based on resulting signals received on individual sensor electrodes of the first set of the sensor electrodes;
couple to and drive a second set of the sensor electrodes during a second time period to determine a second aggregate capacitive coupling between the second set of sensor electrodes and the input object, the second aggregate capacitive coupling determined based on resulting signals received on individual sensor electrodes of the second set of the sensor electrodes, wherein the first set and the second set comprise at least one sensor electrode in common and at least one sensor electrode not in common;
couple to and drive a third set of the sensor electrodes during a third time period to determine a third aggregate capacitive coupling between the third set of the sensor electrodes and the input object, wherein the third time period and the second time period at least partially overlap; and
determine positional information for the input object based on the first and second aggregate capacitive couplings.

9. The input device of claim 8, wherein the first set and the second set comprise at least two sensor electrodes in common.

10. The input device of claim 8, wherein the processing system is further configured to:
selectively couple the first set of sensor electrodes to the processing system based on a window size comprising a number of sensor electrodes; and
selectively couple the second set of sensor electrodes to the processing system based on the window size and based on a step size associated with a number of sensor electrodes in common between the first set and the second set.

11. The input device of claim 8, wherein the processing system is further configured to:
drive a fourth set of the sensor electrodes during a fourth time period to determine a fourth aggregate capacitive coupling between the fourth set of the sensor electrodes and the input object, wherein the second set and the fourth set have at least one sensor electrode in common.

12. The input device of claim 8, wherein the processing system is further configured to:
drive the first set and the second set of sensor electrodes simultaneously during a fourth time period.

13. The input device of claim 8, wherein the processing system comprises a first receiver channel configured to be selectively coupled to the first set and the second set of sensor electrodes.

14. The input device of claim 13, wherein the sensor electrodes of the first set and the second set are selectively coupled to the first receiver channel via a multiplexor.

15. The input device of claim 13, wherein the sensor electrodes of the first set and the second set are selectively coupled to the first receiver channel via a plurality of current conveyors.

16. A method for operating an input device, the method comprising:
driving a first set of a plurality of sensor electrodes during a first time period to determine a first aggregate capacitive coupling between the first set of sensor electrodes and an input object, the first aggregate capacitive coupling determined based on resulting signals received on individual sensor electrodes of the first set of the sensor electrodes, wherein the plurality of sensor electrodes are arranged in a matrix comprising N rows having at least two sensor electrodes per row and M columns having at least two sensor electrodes per column;
driving a second set of the plurality of sensor electrodes during a second time period to determine a second aggregate capacitive coupling between the second set of sensor electrodes and the input object, the second aggregate capacitive coupling determined based on resulting signals received on individual sensor electrodes of the second set of the sensor electrodes, wherein the first set and the second set comprise at least one sensor electrode in common and at least one sensor electrode not in common;
driving a third set of the sensor electrodes during a third time period to determine a third aggregate capacitive coupling between the third set of the sensor electrodes and the input object, wherein the third time period and the second time period at least partially overlap; and determining positional information for the input object based on the first and second aggregate capacitive couplings.

17. The method of claim 16, wherein the first set and the second set comprise at least two sensor electrodes in common.

18. The method of claim 16, further comprising:
selectively coupling the first set of sensor electrodes to a sensor module based on a window size comprising a number of sensor electrodes; and
selectively coupling the second set of sensor electrodes to the sensor module based on the window size and based on a step size associated with a number of sensor electrodes in common between the first set and the second set.

19. The method of claim 16, further comprising:
driving a fourth set of the sensor electrodes during a fourth time period to determine a fourth aggregate capacitive coupling between the fourth set of the sensor electrodes and the input object, wherein the second set and the fourth set have at least one sensor electrode in common.

* * * * *